United States Patent [19]
Harvey et al.

[11] Patent Number: 6,017,750
[45] Date of Patent: Jan. 25, 2000

[54] HYDROLYSIS AND BIODEGRADATION OF THE CHEMICAL WARFARE VESICANT AGENT HT

[75] Inventors: Steven P. Harvey, Fallston; Linda L. Szafraniec; William T. Beaudry, both of Bel Air, all of Md.

[73] Assignee: The United States of America as represented by the Secretary of the Army, Washington, D.C.

[21] Appl. No.: 09/197,538

[22] Filed: Nov. 12, 1998

[51] Int. Cl.[7] .................................................. B09B 3/00
[52] U.S. Cl. ...................... 435/262.5; 588/200; 588/215; 588/238
[58] Field of Search .................. 435/262, 262.5; 588/200, 215, 238

[56] References Cited

U.S. PATENT DOCUMENTS

| | | | |
|---|---|---|---|
| 4,523,043 | 6/1985 | Pytlewski et al. | 568/840 |
| 5,399,495 | 3/1995 | Patt et al. | 435/254.1 |
| 5,474,934 | 12/1995 | Adamus et al. | 435/262.5 |
| 5,550,311 | 8/1996 | Young | 588/19 |
| 5,574,202 | 11/1996 | Pilipski | 588/200 |
| 5,750,364 | 5/1998 | Salanito | 435/42 |

*Primary Examiner*—David A. Redding
*Attorney, Agent, or Firm*—Ulysses John Biffoni; Vincent J. Ranucci

[57] ABSTRACT

A process for the detoxification or demilitarization of the chemical warfare agent HT, a mixture of 2,2'-dichlorodiethyl sulfide and bis-(2-(2-chloroethylthio)ethyl) ether, is disclosed. The process includes 1) treating HT with a hydrolyzing agent to form a mixture of thiodiglycol (TDG) and bis-(2-(2-hydroxyethylthio)ethyl) ether(s?) (T-OH); 2) neutralizing the TDG and T-OH mixture to a pH sufficient for biodegradation of the mixture; and biodegrading the neutralized TDG and T-OH mixture. In preferred embodiments, the hydrolyzing agent is water and the neutralizing is carried out with NAOH. Biodegradation is preferably carried out with a sequential batch reactor.

20 Claims, 3 Drawing Sheets

HYDROLYSIS AND BIODEGRADATION OF THE CHEMICAL WARFARE VESICANT AGENT HT

GOVERNMENT INTEREST

The invention described herein may be manufactured, used and licensed by or for the U.S. Government.

BACKGROUND OF THE INVENTION

1. Field of the Invention

This invention relates generally to the field of demilitarizing chemical warfare agents. More particularly, the invention relates to demilitarizing the agent HT using biodegradation.

2. Description of the Prior Art

Various nerve and vesicant-type chemicals are highly toxic entities which may be employed as chemical warfare agents. The United States military has a relatively large amount of these agents in its chemical warfare agent stockpile. However due to several circumstances, the United States has found it desirable to decrease its inventory of these agents.

In the past, incineration provided a means to dispose of these agents. Incineration is, however, not without its drawbacks. For example, there is the potential for adverse repercussions if even a small amount of these agents is released via the incinerator emissions or spills during handling. Furthermore, due to its negative environmental impact, there has been an ongoing effort by the United States Army to find alternative technologies, when appropriate, to address these shortcomings.

HT is a mixture of about 60 wt % 2,2'-dichlorodiethyl sulfide ("HD" or "sulfur mustard") and about 40 wt % bis-(2-(2-chloroethylthio)ethyl) ether (T). The prior art has provided suggestions regarding the biodegradation of hydrolyzed HD (sulfur mustard). See *Review and Evaluation of Alternative Chemical Disposal Technologies, National Research Council*, National Academy Press, Washington, D.C., 1996, the contents of which are incorporated herein by reference. Biodegradation of the HT mixture, however, is not believed to have been previously disclosed.

The above-mentioned demilitarization of HD includes an initial hot water hydrolysis step which yields primarily thiodiglycol (TDG) and HCl. This initial hydrolysis step removes HD to undetectable (<200 ppb) levels. The HCl is neutralized with NaOH to NaCl and water and the organic products are treated biologically in an aerobic Sequencing Batch Reactor (SBR) seeded with activated sludge. This process yields an aqueous effluent of very low aquatic toxicity (See Harvey, S. P., et al. HD Hydrolysis/Biodegration Toxicology and Kinetics, ERDEC-TR-382, December 1996, the contents of which are incorporated herein by reference), and contains about 2% salt (assuming a 1.3 weight % feed of hydrolyzed HD to the bioreactors). The final products of this process produced no observable dermal irritation or other toxic effects. The efficiency of organic carbon removal was greater than 90% and toxicity characteristic leachate protocol (TCLP) testing of the effluent detected no priority pollutants.

Although this method proved useful for HD, it was not clear that a similar method could be employed for HT due to the presence of the bis-(2-(2-chloroethylthio)ethyl) ether (T), which does not readily convert into TDG under the conditions which cause hydrolysis of HD. In short, the biodegradation properties of (T) alone or in combination with HD were unknown.

SUMMARY OF THE INVENTION

It is therefore an object of the present invention to provide a method of detoxifying the chemical warfare agent HT.

It is a further object of the invention to provide a method of detoxifying HT using a sequencing bioreactor.

In accordance with the present invention, there is provided a method for demilitarizing the chemical warfare agent HT which is a mixture of 2,2'-dichlorodiethyl sulfide (HD) and bis-(2-(2-chloroethylthio)ethyl) ether (T). The method includes the steps of: hydrolyzing the HT to form a mixture of thiodiglycol (TDG) and bis-(2-(2-hydroxyethylthio)ethyl) ether (T-OH); neutralizing the resultant mixture of TDG and T-OH; and biodegrading the resultant neutralized mixture into a demilitarized biomass and liquid effluent.

In an alternative embodiment, a second hydrolysis step, using agents such as HBr, can be employed prior to the neutralizing step in order to enhance conversion of the T-OH ether into thiodiglycol, which is biodegradable. This step is deemed optional because, as shown herein, T-OH is directly biodegradable.

Neutralizing is carried out using a strong base such as NaOH. The biodegradation is preferably carried out in a sequencing batch reactor using readily available activated sludge.

As a result of the present invention, a relatively rapid and efficient means of detoxifying HT is provided. Furthermore, the present invention processes HT into final products which poses substantially no observable irritation or toxic effects.

Other features and advantages of the present invention will be apparent from the following description in which the preferred embodiment has been set forth.

DETAILED DESCRIPTION OF THE PREFERRED EMBODIMENT

Figure 2:
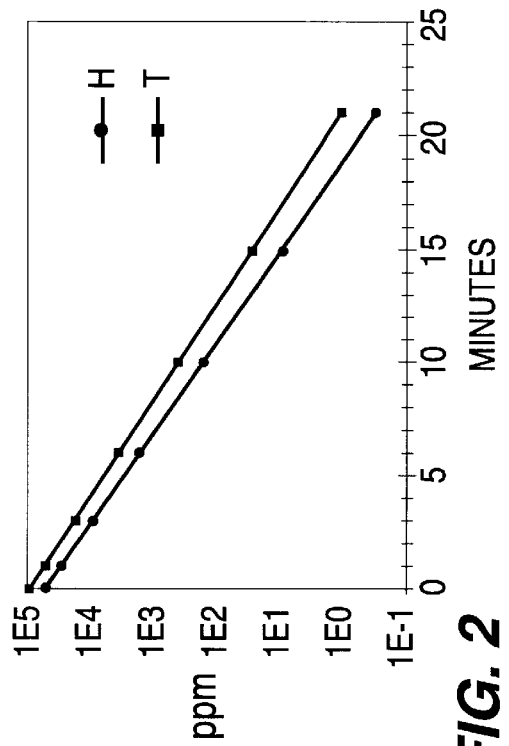
FIG. 2 is a graph illustrating the $T_{1/2}$ for H and T.

In a preferred embodiment of the invention there is provided a process or method for demilitarizing the chemical warfare agent HT. The process comprises the steps of treating HT with a hydrolyzing agent to form a mixture of thiodiglycol (TDG) and bis-(2-(2-hydroxyethylthio)ethyl) ether (T-OH); neutralizing the TDG and T-OH mixture to a pH which is sufficient for allowing biodegradation of the mixture to occur; and biodegrading the neutralized TDG and T-OH mixture into a demilitarized biomass and effluent.

Preferably the hydrolyzing agent is water and the hydrolysis reaction is carried out at a temperature of from about 80° C. to about 99° C., and more preferably at around about 90° C. by using heated water. The length of time the hydrolysis reaction is allowed to continue is generally referred to as a time which is sufficient to allow substantially complete hydrolysis of the HD portion of the HT. That is, the hydrolysis reaction is allowed to proceed for a sufficient time to result in the conversion of the HD primarily to thiodiglycol (TDG) and the T primarily to bis (2-(2-hydroxyethylthio)ethyl) ether (T-OH). Although the T-OH can be converted to TDG, it is not necessary to do so since it is directly biodegradable. Preferably, the hydrolyzing reaction is allowed to proceed from about 20 minutes to about 3 hours, and more preferably for about 2 hours. Those of ordinary skill will understand, of course, that this time will vary somewhat depending upon the concentration of HT in the water and other factors such as the temperature of the reactants and the degree of agitation provided by the reactor.

The amount of water added to the HT is described as an amount which is sufficient to provide the chemical warfare agent in a mixture, of from about 0.01 weight % about 40 weight %. Preferably, the water is added in amount which is sufficient to provide a mixture containing the HT in an amount of from about 0.1 weight % about 20 weight %. More preferably, the amount of water added is sufficient to provide a mixture containing the HT in an amount of from about 2 weight % about 6 weight %.

In an alternative embodiment, a second hydrolysis step is carried out prior to the neutralizing to assist in the conversion of T-OH into TDG. The second hydrolysis is carried out with an acid of the formula HX wherein X is I, Br or Cl; Br is preferred.

The next step of the inventive method involves neutralizing the acidic conditions generated by the hydrolysis reaction. The neutralization is preferably carried out by adding a strong base such as NaOH to the hydrolyzed-treated reactants. Suitable alternative strong bases include $Ca(OH)_2$ and KOH of 0.01 to 100% concentration. The amount of base required to carry out the neutralizing step is an amount which is sufficient to raise the pH of the hydrolyzed solution to a pH of at least about 7, preferably to a pH of at least about 8 and more preferably to a pH of at least about 10.

The final step of the process is the biodegration of the neutralized HT-based solution. Preferably, the aspect of the present invention is carried out in a sequencing batch reactor (SBR) which is capable of performing the steps of a) mixing activated sludge with the neutralized TDG and T-OH mixture; b) aerating and agitating the mixture obtained as a result of step a) to form a biomass and a clarified biodegraded effluent and allows the removal of the clarified biodegraded effluent.

SBRs are preferred because of the relative advantages these reactor configurations offer for the treatment of chemical wastes:

1. Efficiency—SBRs model as a continuous flow stirred tank reactor followed by a plug flow reactor, the ideal volumetric configuration for unsteady state activated sludge systems.

2. Batch Operation—SBRs provide a kinetic advantage over continuous flow systems and are therefore smaller for the same degree of treatment. They also permit batch analysis and toxicity testing prior to discharge; an important feature for the treatment of chemical wastes.

3. Robust nature—SBRs are intentionally operated over a range of substrate concentrations, pH conditions and oxygen concentrations allowing selection of a diverse and robust population of microorganisms.

There are four basic cycles of the SBR—Fill (feed addition), React (aeration and agitation yielding oxidation and mineralization of organics), Settle (concentration of biomass at the bottom of the reactor) and Draw (removal of clarified, biodegraded effluent).

EXAMPLES

The following examples serve to provide further appreciation of the invention but are not meant in any way to restrict the effective scope of the invention.

EXAMPLE 1

MATERIALS AND METHODS

The HT used for this investigation was obtained from the U.S. Army Aberdeen Proving Ground research stock (#HT-5283-CTF-N). It was analyzed by nuclear magnetic resonance (NMR) spectroscopy as approximately 72:28 mole % H:T (61:39 weight ratio, calculated).

The bioreactor feedstocks were prepared by reacting a total of 526 g HT with 90° C. water at 3.8 wt % HT. Reactions were conducted in 3 L batches for two hours each with vigorous agitation. The products from all reactions were pooled and subsequently divided in half. To one half of the product was added NaOH to a final pH of 2, followed by approximately threefold dilution in water to a final total organic carbon (TOC) value of 3727 ppm. This was designated "water-hydrolyzed feed". To the other half of the product was added 471 g of 47–49% HBr. This solution was heated to 90° C. for two hours followed by NaOH addition to a final pH of 11. This material was diluted approximately threefold in water to a final total organic carbon (TOC) value of 3963.5 ppm and designated "HBr-hydrolyzed feed".

Sampling and Analysis of HT/Water Reaction

Samples (1 ml) were removed at intervals of increasing duration over the period between one and 78 minutes reaction time. These samples were quenched in an ice water bath then extracted with one volume of $CHCl_3$. H and T were quantitated by full scan EI mass spectrometry using a Hewlett-Packard 5970 MSD. The injection port temperature was 250° C. and temperature program was 70° C.(3 min) to 265° C.(2 min) at 10° C./min. The 5970 MSD was used in electron impact (EI) mode scanning from 50–450 amu. Calibration measurements were calculated using external standardization technique. The HT neat mixture was diluted to produce a five point calibration within the range of concentrations used in the study. The mixture of H and T was determined to be 62.9% H and 21.5% T by GC/TCD (thermal conductivity detector).

Low Level Analysis for H and T

The hydrolysis product was analyzed for residual H and T by extracting 50:1 with chloroform and analyzing by gas chromatography/ion trap detector. No H or T were detected with a method detection limit of 1.8 ug/ml.

Nuclear Magnetic Resonance Spectroscopy

NMR analyses were conducted using a Varian Unity Plus 400 Fourier Transform (FT) NMR spectrometer which operates at 400 MHZ for 'H observation and at 100 MHZ for '3C observation. All spectra were obtained at probe temperature (22 +/−1° C.) with double precision data accumulation. Samples were provided in $CDCl_3$, $D_2O$ or water. All samples run in $CDCl_3$ were referenced to internal tetramethylsilane (TMS) using the $CHCl_3$ resonance ($\delta^1H$, 7.24; $\delta^{13}C$, 77.2) as a secondary reference. $^1H$ spectra in $D_2O$ and water were referenced to external sodium 3-trimethylsilylpropionate-2, 2,3,4-d4 (TSP) in $D_2O$. Quantitative data were obtained by digital integration of peak areas.

Survey $^1H$ spectra were run for product identification using a sweep width of 8000 Hz (20 ppm), a pulse width of at least 12 microseconds (30 degrees), an acquisition time of 2–4 seconds and a pulse delay of 2–4 seconds. Corresponding $^{13}C$ spectra were acquired using a sweep width of at least 25000 Hz (250 ppm), an acquisition time of 1.6 seconds, and a pulse delay of 2–3 seconds. Spectra were accumulated until the desired signal-to-noise ratio was achieved. Presaturation of the large $H_2O$ peak was often used (standard Varian software) to minimize this resonance in the spectrum.

Spectra obtained for kinetic runs were acquired with fixed gain and integral values using the absolute intensity (AI) mode of the spectrometer. Each set of samples from a reaction were analyzed under identical operating conditions so that the integral area from different samples from the set could be directly compared. For $^1H$ spectra, 16 transients were collected using a sweep width of 8000 Hz (20 ppm), an acquisition time of 2.0 seconds, a pulse width of 7 microseconds (21 degrees) and a pulse delay of 2 seconds. For $^{13}C$ spectra, 64 transients were collected using a sweep width of 25000 Hz, an acquisition time of 2 seconds, a pulse width of 12 microseconds (90 degrees), and a pulse delay of 2.5 seconds. $^1H$ data obtained in $CDCl_3$ were normalized to the residual $CHCl_3$ resonance in the solvent. Data obtained in water or $D_2O$ were not normalized.

Total Organic Carbon Analysis

Samples were analyzed using a Dohrman DC-80 Total Organic Carbon system. The TOC system uses an acid persulfate solution in the presence of oxygen to convert any organic carbon in the sample to $CO_2$ which is directed past an infrared source and detector previously calibrated and shown to be stable prior to analyses. The results were calculated by comparison of measured absorption values to the initial calibration.

Bioreactor Equipment and Operational Parameters

New Brunswick BioFlo 3000 fermentors fitted with 5 L vessels were used as SBRs. Aeration was provided through a sparger at a constant 20 kPa, except during settling which had no aeration. Agitation was generally set at 125 rpm and was provided by flat-blade turbine impellers. Reactor pH was controlled by the addition of 10–15 g/L $NaHCO3$ to the feed (adjusted daily as needed), although a NaOH pump operated by a controller was set to operate when the pH dropped below 7.0. Use of NaOH for pH control usually proved unnecessary.

Calculation of Mass Balance

Mass balance was calculated based on an assumption of HT comprised of 60 weight % H and 40 weight % T. The starting compounds were assumed to react stoichiometrically to form thiodiglycol and T-OH, respectively (the actual products obtained from these reactions and their ratios are listed in Table 2). The carbon from the organic components was assumed to be biologically converted 50% to $CO_2$ and 50% to biomass (an approximate empirical value). The balance was conducted as follows: Carbon was balanced first, with half the carbon from the feed converted to $CO_2$ and half to biomass. The empirical formula used for the biomass ($C_5H_{9.615}O_{1.5024}N_{1.202}P_{0.1164}S_{0.0375}K_{0.0615}$) is the published formula for *Escherichia coli*. Oxygen was balanced next, in reverse (the amount of oxygen required to form the products determined the amount calculated for the feed). Hydrogen was then balanced in the same manner as the carbon (the amount of hydrogen in the feed determined the amount of hydrogen in the products). The concentration of $Na_2SO_4$ in the effluent was calculated from the amount of sulfur in the feed minus the very small amount consumed by the biomass. The designated amount of $NH_4Cl$ in the feed was the calculated stoichiometric nitrogen requirement for the biomass only. The designated amount of $KH_2PO_4$ in the feed was the stoichiometric requirement of phosphorus for the biomass. The $KH_2PO_4$ also provided the required potassium for the biomass (in excess, with the remainder calculated as KCl). The concentration of NaCl in the effluent was calculated from the amount of chloride in the feed (from HT and $NH_4Cl$) minus the amount used to form KCl. The amount of NaOH in the feed was calculated from the stoichiometric requirement for the neutralization reaction (two equivalents of NaOH per equivalent of chlorinated organic) plus the amount required to charge balance the sulfate formed from oxidation of the sulfur from the organics (minus the sulfur used for biomass).

Measurement of Oxygen Uptake Rate

Specific oxygen uptake rate (SOUR) was measured inside the bioreactors by shutting off the air supply, purging the reactor headspace with nitrogen, and following the decrease in dissolved oxygen concentration over time. The fractional change in dissolved oxygen concentration was multiplied by the solubility of oxygen in a similar salt solution (about 7 ppm in this case) and divided by the reactor volume, the duration of the assay and the 10-day averaged biomass concentration. Values were expressed as mg oxygen consumed per liter per hour per gram of biomass per liter of culture.

Measurement of Nitrate, Nitrite, and Ammonia Concentrations

Nitrate, nitrite, phosphate and ammonia concentrations were measured with water test kits purchased from Hach (Loveland, Colo.). Nitrate Hach Method 10020 was measured spectrophotometrically at 410 nm using a chromotropic acid method with a range of 0 to 30.0 mg/L $NO_3^-$-N. Nitrite was measured spectrophotometrically at 507 nm using a diazotization method (Hach Method 8507) with a range of 0 to 0.3 mg/L $NO_2^-$-N. Ammonia was measured spectrophotometrically at 655 nm using a salicylate method (Hach Method 8155) with a range of 0 to 50.0 mg/L $NH_3$-N. Phosphate was measured spectrophotometrically at 530 nm using an amino acid method (Hach Method 8178) with a range of 0 to 30 mg/L PO43-. In all cases, out of range values were determined by dilutions of the effluent and the use of appropriate blanks.

Microtox Assays

The Microtox Bioassay exposes a bioluminescent marine bacterium (*Vibrio fischeri*) to a toxicant and measures the change in light output as the means of determining toxic effects on the organisms. Assays were conducted as described by by Azur Environmental. $EC_{50}$ values were calculated using the Microtox statistical software. Published values represent the $EC_{50}$ for five minute exposures. Phenol was used as a reference toxicant.

RESULTS AND DISCUSSION

T Hydrolysis

Hydrolysis Rate

Figure 1:
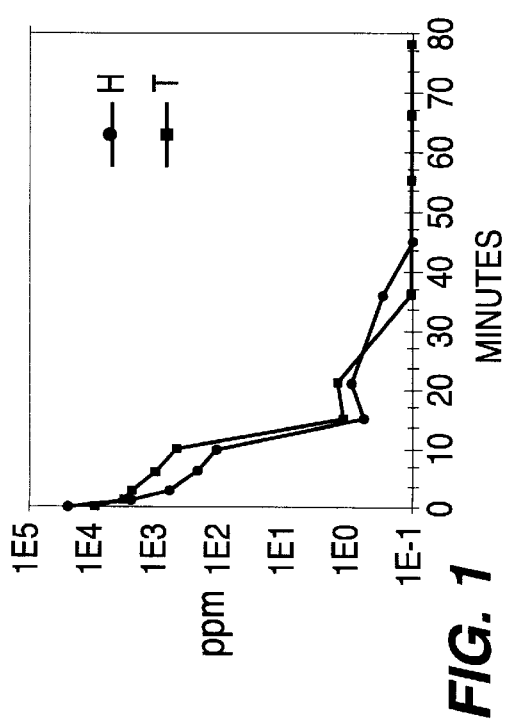
FIG. 1 is a graph showing the rate of hydrolysis of H and T in a well-agitated reactor.

The hydrolysis rates of H and T were measured in a well-agitated reactor. Sampling and analysis were performed as described above in MATERIALS AND METHODS. HT (3.8 weight %) was added batchwise to 200 ml water at 90° C. with vigorous agitation. FIG. 1 shows the H and T concentrations in this system over time. The initial value (time=zero minutes) is a calculated value based on the known amount of H and T added to the reaction. Subsequent values were determined analytically from extracts of samples. The 15 minute values for both compounds are somewhat out of range, presumably attributable to the inherent irregularities in sampling from a two-phase reaction matrix. Nevertheless, the hydrolysis of both compounds can be seen to proceed to levels below 1 ppm in about 20 minutes.

The values from FIG. 1 greater than 1 ppm were fit to straight lines (FIG. 2) from which the H and T half-lives were determined. The calculated half-lives were 1.4 minutes for H and 1.6 minutes for T in this system.

EXAMPLE 2

Figure 3B:
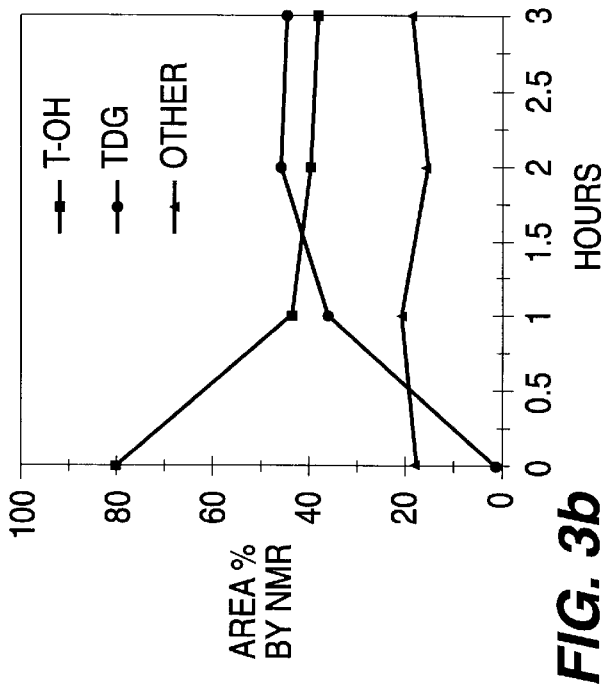
FIGS. 3a–3c are graphic illustrations of the conversion of T-OH to TDG using HBr, HI and HCl.
Figure 3A:
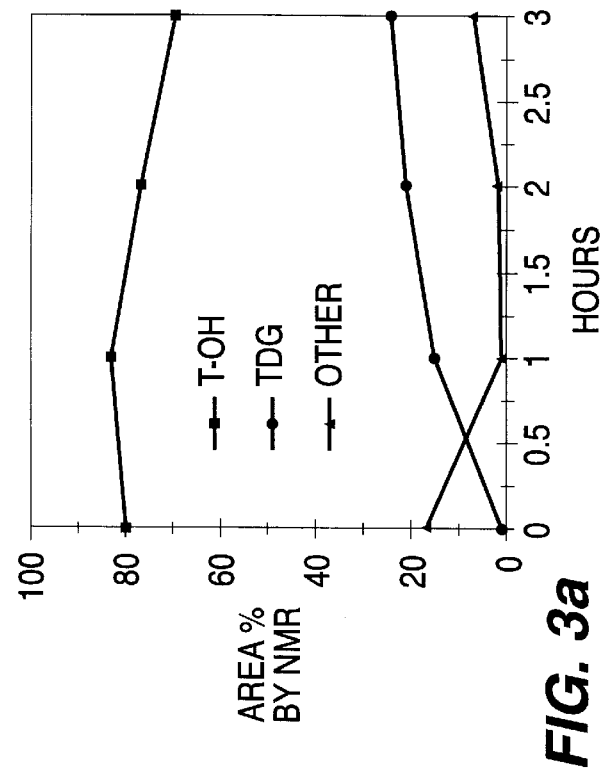
Figure 3C:
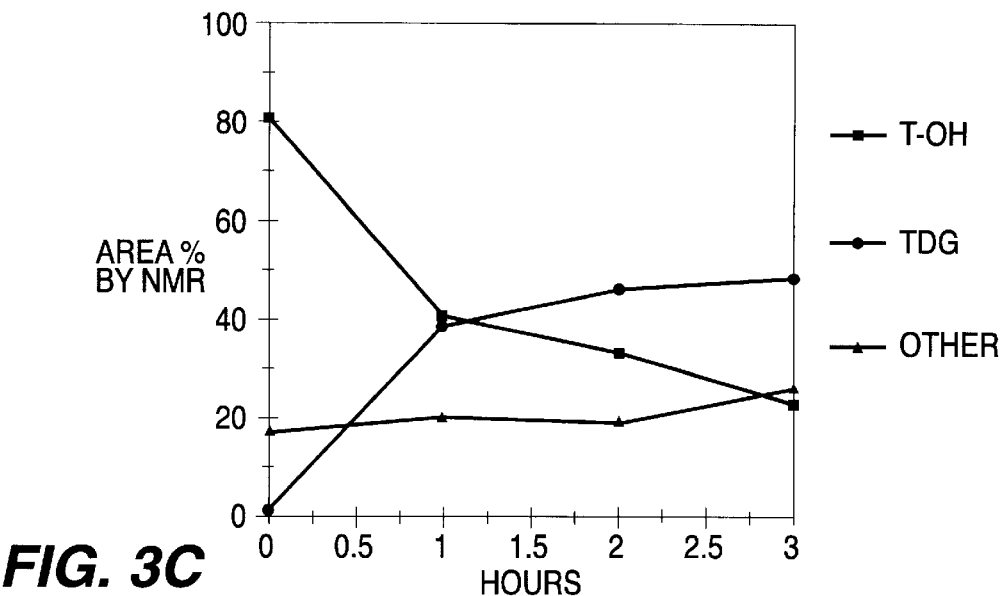

In this example, the effects of HBr and HI on the conversion of T-OH to TDG were investigated and compared to the HCl effects. FIG. 3.a. shows the conversion of 5 wt % T-OH to TDG at 90° C. with no added acid (only two equivalents of HCl, derived from the starting T, were present). FIGS. 3.b and 3.c show the results of the same reaction at 90° C. in the presence of added HI and HBr, respectively. The added HI and HBr concentrations were equal to the HCl concentration (0.38 M each). Results show a significant enhancement of the rate of conversion of T-OH to TDG with both HBr and HI, in relation to HCl alone. The initial rates with HBr and HI were similar although the HBr reaction went further toward completion (a reduction in T-OH from 80.7% to 23.8% in three hours as compared to a reduction from 80.7% to only 37.6% with HI). Additionally, HBr is potentially somewhat more suitable for use in a bioreactor due to its lower molecular weight (80.91 as compared to 127.91 for HI), which, on a molar basis, yields a lower weight percent salt composition in the neutralized bioreactor effluent. Thus, although both acid halides were effective HBr was deemed to be the acid halide of choice for generation of acid hydrolyzed feedstock.

EXAMPLE 3

Comparative Biodegradation of HT Hydrolysis Products

The objective of this example was to compare the results obtained when the complete products of the two different HT hydrolysis reactions were fed to separate SBR's seeded with activated sludge. The first (water-hydrolysis) feed was generated by hydrolysis of HT in 90° water at 3.8 wt % for two hours. The second (HBr-hydrolysis) feed included the secondary acidic 10 hydrolysis step with 0.29 M HBr added to the hydrolysate (the HBr concentration was equal to the calculated HCl concentration derived from the starting HT). These two feeds were neutralized with NaOH and provided as sole carbon source to the bioreactors and the performance of the two reactors was monitored and compared daily over the course of an 86 day study. The study was conducted as a side-by-side comparison of the results of biodegradation of the two potential feeds. The identical bioreactors were operated, whenever possible, under identical conditions with the two different feeds. Minor independent operational adjustments were made as necessary for control of pH (amount of $NaHCO_3$ and/or NaOH added) and nitrate/nitrite levels. The objective was to determine which, if either, hydrolysis process would permit stable bioreactor operation, efficient carbon removal and acceptable effluent quality (organic composition, solids content, and aquatic toxicity).

Feed Characterization

The products of the initial hydrolysis reaction were first analyzed by gas chromatography with an ion trap detector for the presence of any residual H or T. No H or T were detected with a method detection limit of 1.8 ug/ml. The two respective feedstocks, "water-hydrolyzed feed" and "HBr-hydrolyzed feed" were subsequently analyzed by $^{13}C$ NMR which indicated that only a relatively minor portion of the T-OH was converted to TDG in the acidic hydrolysis (HBr) step (a reduction of 27.8 to 25.8 area %). However, the majority of the "other" portion apparently was converted to TDG, since the "other" portion was reduced from 16.7 to 3.04 area % while the TDG portion was increased from 55.7 to 73.1 area %.

Both feeds were also analyzed for phosphate, ammonia, nitrate and nitrite content as described in Materials and Methods section of Example 1. The water-hydrolyzed feed contained 0.09 mg/L phosphate and undetectable ammonia concentrations. HBr-hydrolyzed feed contained 0.37 mg/L phosphate and undetectable ammonia. Neither feed contained any detectable levels of nitrate, nitrite or ammonia.

Bioreactor Operation and Results

Both SBRs were seeded with activated sludge from the Back River Wastewater Treatment Plant in Essex, Md. Biomass concentrations were measured as mixed liquor suspended solids (MLSS). Starting mixed liquor suspended solids (MLSS) concentrations were adjusted to approximately 4.5 g/L. Effluent TOC concentration, ammonia, nitrate, nitrite, MLSS, and effluent suspended solids (ESS) levels were all monitored on a regular basis (several times a week or as required) throughout all phases of the operation. Both reactors were acclimated by operation on a flexible schedule over a period of 36 days for a total of 1.5 hydraulic residence times (HRT). Following this, the reactors were fed for 20 days on a 20 day HRT and 80 day solids residence time (SRT). This SRT was maintained for the duration of the study. Solids were wasted from the mixed reactor at the end of the react cycle. At the end of the 20 day HRT period, samples were taken and aquatic toxicity tests were performed. The reactors were then adjusted to a 15 day HRT over a 3 day period and operated for one 15 day HRT. At the end of this 15 day period, aquatic toxicity was again tested. Another adjustment period of 2 days was permitted prior to the final test period which consisted of operation over one 10 day HRT. Aquatic toxicity was again measured at the end of the 10 day HRT period. The operational and toxicological data provide a comparison of the results of biodegradation of two different feeds (water and HBr-hydrolyzed HT), plus a comparison of the results of operation of each reactor over three different hydraulic residence times (20, 15 and 10 days).

MLSS

Figure 4:
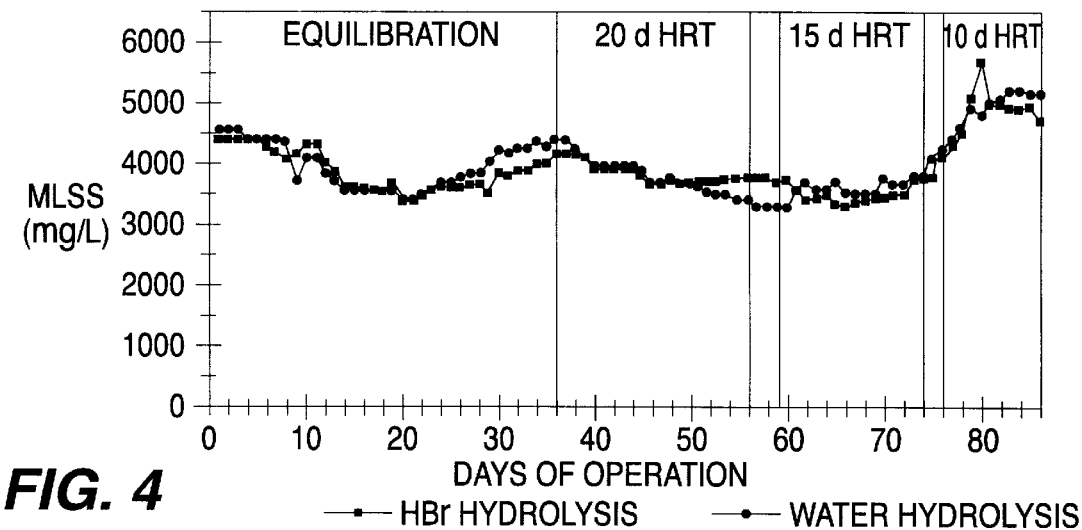
FIG. 4 is a graph of the MLSS data reported in Example 3.
Figure 5:
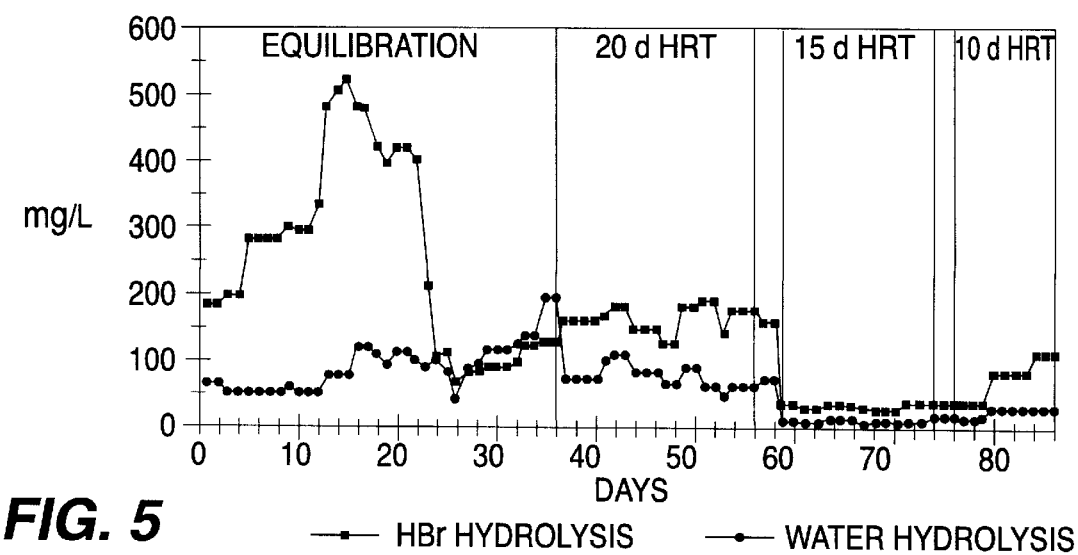
FIG. 5 is a graph of the ESS data reported in Example 3.
Figure 6A:
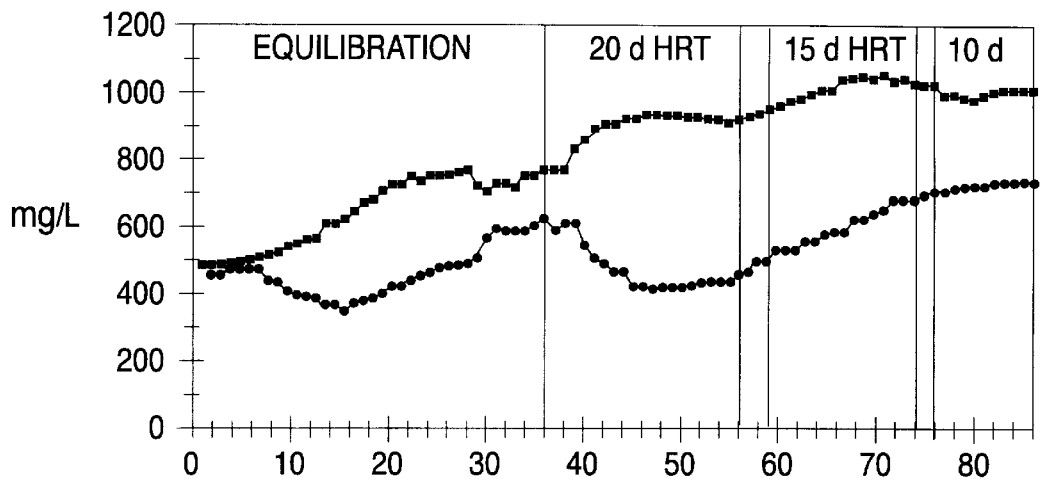
FIGS. 6a–b are graphic illustrations of the total organic carbon analysis data reported in Example 3.
Figure 6B:
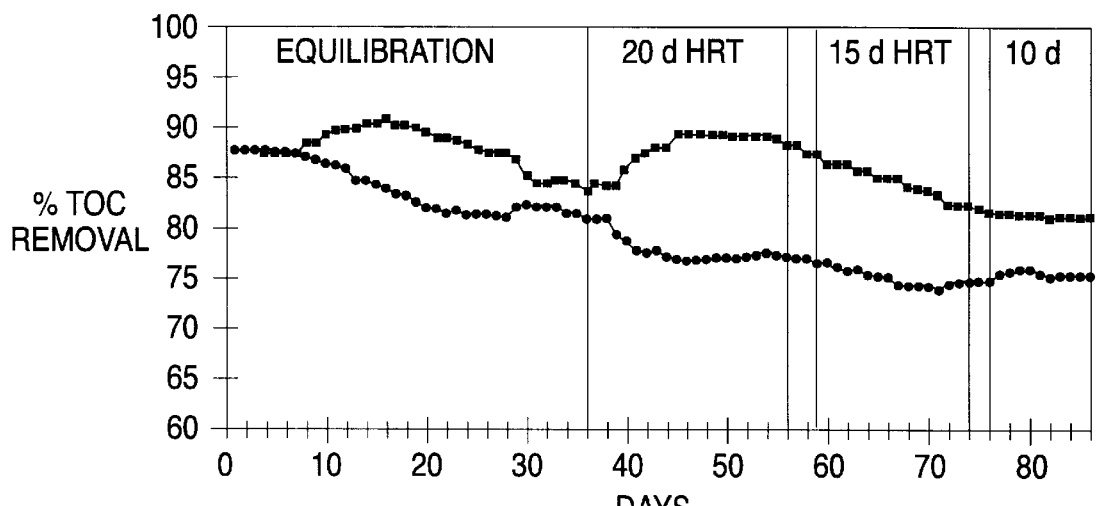

MLSS was measured 3–5 times per week. FIG. 4 shows the trends in MLSS over the course of all the tests. Initially, during the acclimation period, MLSS decreased due to biomass digestion. The decrease continued somewhat during the 20 day HRT, generally leveled off during the 15 day HRT and increased during the 10 day HRT, corresponding with the increased levels of daily feed during each subsequent operating period.

ESS

Figure 7:
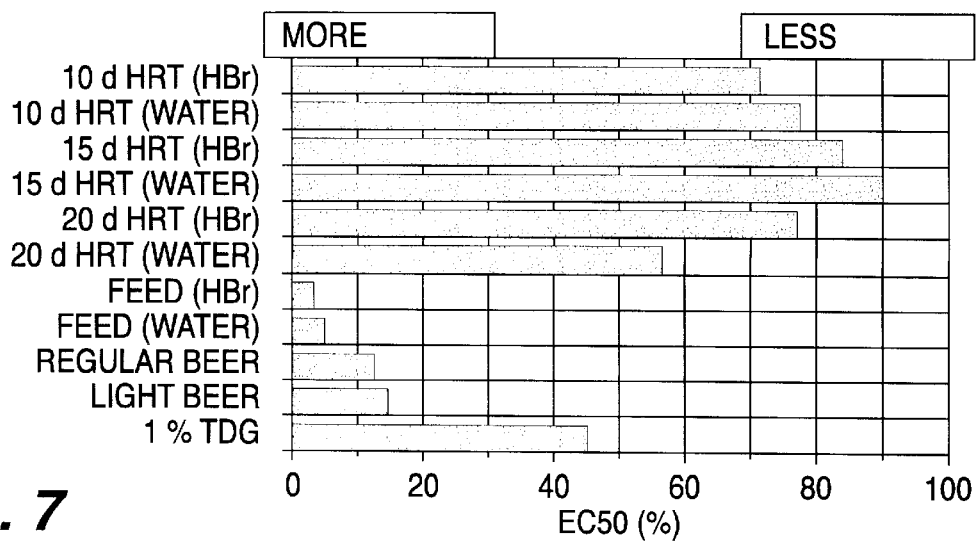
FIG. 7 graphically illustrates the levels of effluent suspended solids generated in Example 3.

ESS was measured 2–4 times per week from 50–100 ml samples of the drawn effluent. FIG. 7 illustrates the trends in ESS over the course of all the tests. With the exception of an initial ESS excursion to over 500 mg/L in the HBr-hydrolyzed feed reactor, levels in both reactors remained below about 200 mg/L and decreased to below about 100 mg/L during the 15 and 10 day HRT operating periods.

SOUR

SOUR was measured at the beginning of each of the three HRT test periods. Measurements were made as a function of pH. Results are shown in the Table below for each reactor at the end of the equilibration period and each of the three test HRT periods.

|  | 20 d HRT | 15 d HRT | 10 d HRT |
|---|---|---|---|
| Water-Hydrolyzed Feed |  |  |  |
| pH 6.5 | 2.04 | 4.29 | 2.93 |
| pH 7.0 | 2.39 | 5.15 | 4.04 |
| pH 7.5 | 2.71 | 4.09 | 3.13 |
| pH 8.0 | 2.88 | 3.24 | 4.47 |
| pH 8.5 | 1.45 | 2.49 | 3.07 |
| pH 9.0 | 0.62 | 2.14 | 1.66 |
| HBr-Hydrolyzed Feed |  |  |  |
| pH 6.5 | 1.30 | 0.69 | 1.52 |
| pH 7.0 | 2.73 | 1.52 | 1.23 |
| pH 7.5 | 1.47 | 1.73 | 0.90 |
| pH 8.0 | 1.32 | 1.82 | 1.63 |
| pH 8.5 | 0.87 | 1.53 | 2.29 |
| pH 9.0 | 0.66 | 1.22 | 1.97 |

A general increase in SOUR values was seen with time for both reactors as the respective populations of organisms acclimated to their feeds.

Effluent TOC and Efficiency of TOC Removal

Feed TOC measurements were made in triplicate at 1:10 dilutions prior to the start of the test. Effluent TOC was measured from the clarified and centrifiged supernatant on a periodic basis (generally 3–4 times/week). The effluent TOC concentrations are presented in FIG. 8.*a*. and the efficiency of TOC removal is presented in FIG. 8.*b*. Overall TOC removal eff~ciency was 86.1% for the water-hydrolyzed feed and 79.3% for the HBr-hydrolyzed feed. Effluent TOC concentrations averaged 517.6 ppm for the water-hydrolyzed feed and 819 ppm for the HBrhydrolyzed feed.

Loading

The loading was calculated daily based on the feed TOC and volume and the 10 day moving average of the MLSS. Results are presented in FIG. 7. In general, the loading started at about 0.04–0.05 mg TOC/mg MLSS in both reactors, then climbed to 0.9–1.0 as the HRT was decreased. The MLSS initially dropped during equilibration then remained fairly steady during the 20 and 15 day HRT periods. As the HRT decreased to 10 days, the loading briefly increased to 0.9–1.0 followed by a decrease to 0.07–0.08 as the MLSS increased, due to the increased fill volume and unchanged (80 day) SRT.

Nitrate, Nitrite, and Ammonia Levels $NH_4Cl$ was initially fed at a concentration of 1445–1600 mg/L throughout the start-up period. Ammonia, nitrate and nitrite assays were initially conducted approximately every 5–10 days. During the 20 day HRT period, monitoring of ammonia levels was increased and feed $NH_4Cl$ levels were adjusted according to the nitrogen levels in the effluent, with a target total effluent nitrogen concentration of <5 ppm. During the 10 day HRT period, effluent nitrogen levels were measured on a daily basis and feed nitrogen levels adjusted accordingly. The overall average total nitrogen levels (nitrate-N+nitrite-N+ammonia-N) for the 10 day HRT period were 3.2 ppm for the water hydrolyed feed and 3.7 ppm for the HBr-hydrolyzed feed. Thus it proved feasible to control total nitrogen levels to less than 5 ppm by daily adjustment of the $NH_4Cl$ levels in the feed over the course of the 10 day HRT operating period.

Aquatic Toxicity of Effluent

Effluents were analyzed for their toxicity ($EC_{50}$) levels toward luminescent test bacteria (Microtox test). In previous studies on the hydrolysis and biodegradation of HD), this test proved to be particularly sensitive and reliable (compared to other aquatic toxicity tests) as a comparative determinant of the aquatic toxicity of the feed and effluent materials. Results of Microtox tests on the HT feeds and the effluents at the end of each test period are shown in FIG. 7. The biodegradation process achieved a 28–44 fold reduction in toxicity of the waterhydrolyzed feed and a 19–21 fold reduction in toxicity of the HBr-hydrolyzed feed. For purposes of comparison to known materials, the toxicities of light and regular beer were also measured and both were found to have $EC_{50}$ values intermediate to those of the bioreactor feeds and effluents. Another control used was 1% TDG in water which was relevant because TDG comprises a major component in both feeds and has a known $LD_{50}$ value of 3000–4000 mg/kg for neat TDG. The toxicity of the TDG solution was also intermediate to those of the bioreactor feed and effluent solutions. In summary, the bioreactor effluents were consistently less toxic than either beer or 1% TDG towards Microtox test bacteria.

Chemical Analysis of Effluent

Samples of the effluent from the last day of the biodegradation study were analyzed by $^1H$ and $^{13}C$ NMR. The area percent NMR data were converted to TOC concentrations based on the final TOC measurements from the effluent of each reactor. The efffluents were found to differ primarily in the presence of the cyclic sulfonium ion found in the HBrhydrolyzed feed reactor.

Effluents from both reactors were also analyzed for semi-volatile priority pollutant compounds by U.S. Environmental Protection Agency (EPA) toxicity characteristic leachate protocol (TCLP) procedures. No semi-volatile priority pollutant compounds were detected at or above the EPA-specified detection limits.

Mass Balance

The mass balance for each process was calculated as described previously. Total calculated input and output per ton of HT is listed in Table 2 below.

|  | Water Hydrolysis | HBr Hydrolysis |
|---|---|---|
| TONS INPUT | | |
| HT | 1.00 | 1.00 |
| NaOH | 0.7 | 1.12 |
| $O_2$ | 1.25 | 1.25 |
| $NH_4Cl$ | 0.18 | 0.18 |
| $KH_2PO_4$ | 0.04 | 0.04 |
| HBr | | 0.86 |
| $H_2O$ | 0.19 | 0.19 |
| Total: | 3.35 | 4.63 |
| TONS OUTPUT | | |
| $CO_2$ | 0.60 | 0.60 |
| $H_2O$ | 0.73 | 0.92 |
| Biomass | 0.26 | 0.26 |
| $Na_2SO_4$ | 0.95 | 0.95 |
| NaCl | 0.80 | 0.80 |
| KCl | 0.01 | 0.01 |
| NaBR | | 1.09 |
| Total Solids | 2.02 | 3.11 |
| Total | 3.35 | 4.63 |

The stoichiometry of the two processes is identical with the exception of the greater acid and base input and greater water and NaBr output of the HBr-hydrolysis process.

CONCLUSIONS

HT hydrolysis proceeds to completion (H and T levels below 1 ppm) within about 30 minutes in a well-agitated system at 90° C. The half-lives of H and T are about 1.4 and 1.6 min, respectively in this system.

The hydrolysis of 3.8 wt % HT in water yielded a product containing 55.7% TDG, 27.8% T-OH and 16.7% "other" (linear sulfonium ions, hydrolysis products of impurities, etc.). Hydrolysis of 3.8 wt % HT in water followed by acid hydrolysis with 0.38 M aqueous HBr yielded 73.1% TDG, 25.8% T-OH and 3.04% "other". Thus, the HBr substantially increased the yield of TDG and decreased the yield of compounds in the "other" category. With respect to inorganic components, the primary difference between the two feeds is the presence of NaBr in the HBr-hydrolyzed feed. The water-hydrolyzed HT contains approximately 1% NaCl whereas the HBr-hydrolyzed HT contains approximately 1% NaCl plus approximately 1% NaBr.

Both bioreactors exhibited generally stable operation throughout the different test cycles (equilibration, 20, 15 and 10 day HRT periods). Lower HRTs were generally correlated with lower effciencies of TOC removal, although it is not certain to what extent that was due to equilibration and to what extent it was due to actual differences in degradation of the feed compounds. At any rate, the effciency of TOC removal did not necessarily correspond to differences in aquatic toxicity; for example, Microtox data actually showed slightly lower toxicity for the 15 d HRT effluent than for that from either the 10 or 20 day HRTs. In general though, toxicity from both reactors at all HRTs was consistently low relative to the feed and the controls. Detailed comparisons of the performance of the two bioreactors with respect to mixed liquor and effluent solids concentrations (MLSS and ESS), organic removal effficiency (TOC), loading, oxygen uptake rate (SOUR) and toxicity showed a generally more favorable outcome with the water-hydrolyzed feed. In addition to the improved performance, the use of the water hydrolyzed feed offers the advantages of a simpler hydrolysis process (no requirement for the HBr-mediated acid hydrolysis step) and a more favorable mass balance due to the elimination of HBr from the process input and NaBr from the output. In summary, hydrolysis in hot water followed by neutralization with NaOH and aerobic biodegradation in a Sequencing Batch Reactor seeded with activated sludge is the more preferred of the two approaches tested for the combined chemical/biological treatment of the chemical warfare agent HT.

The various publications mentioned in this application are hereby incorporated by reference herein.

While there have been described what are presently believed to be the preferred embodiments of the invention, those skilled in the art will realize that changes and modifications may be made without departing from the spirit of the invention. It is intended to claim all such changes and modifications as fall within the true scope of the invention.

We claim:

1. A method for demilitarizing the chemical warfare agent HT which comprises a mixture of 2,2'-dichlorodiethyl sulfide and bis-(2-(2-chloroethylthio)ethyl) ether (HT), comprising the steps of:

treating HT with a hydrolyzing agent to form a mixture of thiodiglycol (TDG) and
   bis-(2-(2-hydroxyethylthio)ethyl) ether(s?) (T-OH);
   neutralizing said TDG and T-OH mixture to a pH sufficient for biodegradation of said mixture; and
   biodegrading said neutralized TDG and T-OH mixture into a demilitarized biomass and effluent.

2. The method of claim 1, wherein said hydrolyzing agent is water.

3. The method of claim 1, wherein said hydrolyzing is carried out at a temperature of from about 80° C. to about 99° C.

4. The method of claim 3, wherein said hydrolyzing is carried out at a temperature of about 90° C.

5. The method of claim 1, wherein said hydrolyzing is carried out for from about one hour to about three hours.

6. The method of claim 2, wherein said water is added in amount sufficient to provide a mixture containing said chemical warfare agent in an amount of from about 0.01 weight % about 40 weight %.

7. The method of claim 6, wherein said water is added in amount sufficient to provide a mixture containing said chemical warfare agent in an amount of from about 0.1 weight % about 20 weight %.

8. The method of claim 7, wherein said water is added in amount sufficient to provide a mixture containing said chemical warfare agent in an amount of from about 2 weight % about 6 weight %.

9. The method of claim 1, wherein said neutralizing is carried out by adding a strong base.

10. The method of claim 9, wherein said strong base is selected from the group consisting of NaOH, $Ca(OH)_2$ and KOH.

11. The method of claim 1, wherein said TDG and T-OH mixture is neutralized to a pH of at least about 7.

12. The method of claim 1, wherein said TDG and T-OH mixture is neutralized to a pH of at least about 8.

13. The method of claim 1, wherein said TDG and T-OH mixture is neutralized to a pH of at least about 10.

14. The method of claim 1, wherein said biodegrading is carried out in a sequencing batch reactor.

15. The method of claim 14, wherein said biodegrading comprises the steps of:

a) mixing activated sludge with said neutralized TDG and T-OH mixture;

b) aerating and agitating the mixture obtained as a result of step a) to form a biomass and a clarified biodegraded effluent; and c) removing the clarified biodegraded effluent.

16. The method of claim 15, wherein in said aerating and agitating step is carried out by a flat blade turbine impeller at from about 100 to 150 revolutions per minute.

17. The method of claim 1, wherein said biodegrading step is carried out at a pH of from about 6 to about 8.

18. The method of claim 1, further comprising conducting a second hydrolyzing step prior to said neutralizing.

19. The method of claim 18, wherein said second hydrolyzing is carried out with an acid of the formula HX wherein X is a member of the group consisting of I, Br, and Cl.

20. The method of claim 15, wherein said X is Br.

* * * * *